US012675277B2

(12) United States Patent
Khosrowpour et al.

(10) Patent No.: US 12,675,277 B2
(45) Date of Patent: Jul. 7, 2026

(54) EMBEDDED OPTIMIZER FOR INFORMATION HANDLING SYSTEMS

(71) Applicant: DELL PRODUCTS L.P., Round Rock, TX (US)

(72) Inventors: Farzad Khosrowpour, Pflugerville, TX (US); Suraj M Varma, Portland, OR (US); Mitchell Markow, Hutto, TX (US)

(73) Assignee: Dell Products L.P., Round Rock, TX (US)

( * ) Notice: Subject to any disclaimer, the term of this patent is extended or adjusted under 35 U.S.C. 154(b) by 186 days.

(21) Appl. No.: 18/479,558

(22) Filed: Oct. 2, 2023

(65) Prior Publication Data

US 2025/0110724 A1 Apr. 3, 2025

(51) Int. Cl.
*G06F 9/44* (2018.01)
*G06F 8/61* (2018.01)
*G06F 8/65* (2018.01)
*G06F 11/34* (2006.01)

(52) U.S. Cl.
CPC ................. *G06F 8/65* (2013.01); *G06F 8/61* (2013.01); *G06F 11/3409* (2013.01)

(58) Field of Classification Search
CPC ....................................................... G06F 8/65
USPC ......................................................... 717/168
See application file for complete search history.

(56) References Cited

U.S. PATENT DOCUMENTS

| | | | | |
|---|---|---|---|---|
| 6,976,062 | B1 * | 12/2005 | Denby .................... | H04L 67/62 |
| | | | | 709/219 |
| 9,311,486 | B2 * | 4/2016 | Ayanam ................ | G06F 21/572 |
| 10,460,241 | B2 | 10/2019 | Chou et al. | |
| 10,817,398 | B2 * | 10/2020 | Cencini ...................... | G06F 1/26 |
| 11,163,297 | B2 * | 11/2021 | Dayama ........... | G05B 19/41875 |
| 11,263,024 | B2 | 3/2022 | Guo et al. | |
| 2011/0283274 | A1 * | 11/2011 | Krzyzanowski .......... | G06F 8/65 |
| | | | | 717/171 |
| 2014/0006764 | A1 * | 1/2014 | Swanson ................ | G06F 9/4401 |
| | | | | 713/2 |
| 2017/0031671 | A1 * | 2/2017 | Joshi .................... | G06F 11/1469 |
| 2017/0249996 | A1 * | 8/2017 | Gottscho ............. | G06F 11/3037 |
| 2018/0196805 | A1 * | 7/2018 | Kamerman ............. | G06F 16/51 |
| 2018/0232245 | A1 * | 8/2018 | Aseev ........................ | G06F 8/61 |
| 2020/0264784 | A1 * | 8/2020 | Wu ........................ | G06F 3/0688 |

FOREIGN PATENT DOCUMENTS

CN 115870991 A * 3/2023 ............... G06F 8/65

* cited by examiner

*Primary Examiner* — Evral E Bodden
(74) *Attorney, Agent, or Firm* — Larson Newman, LLP

(57) ABSTRACT

An information handling system includes a processor, a baseboard management controller that provides a management environment that operates out-of-band from the processor, and a system optimization controller that operates in the management environment. The system optimization controller evaluates a first software image instantiated on the processor to determine the presence of optimization firmware in the first software image, stores the optimization firmware, evaluates a second software image to be installed on the processor to determine whether or not the optimization firmware is present in the second software image, and, when the optimization firmware is not present in the second software image, retrieves the optimization firmware and installs the optimization firmware on the processor.

16 Claims, 4 Drawing Sheets

EMBEDDED OPTIMIZER FOR INFORMATION HANDLING SYSTEMS

FIELD OF THE DISCLOSURE

This disclosure generally relates to information handling systems, and more particularly relates to providing an embedded optimizer for information handling systems.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems.

SUMMARY

An information handling system may include a processor, a baseboard management controller that provides a management environment that operates out-of-band from the processor, and a system optimization controller that operates in the management environment. The system optimization controller may evaluate a first software image instantiated on the processor to determine the presence of optimization firmware in the first software image, store the optimization firmware, evaluate a second software image to be installed on the processor to determine whether or not the optimization firmware is present in the second software image, and, when the optimization firmware is not present in the second software image, retrieve the optimization firmware and install the optimization firmware on the processor.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings. However, other teachings can certainly be used in this application. The teachings can also be used in other applications, and with several different types of architectures, such as distributed computing architectures, client/server architectures, or middleware server architectures and associated resources.

Figure 1:
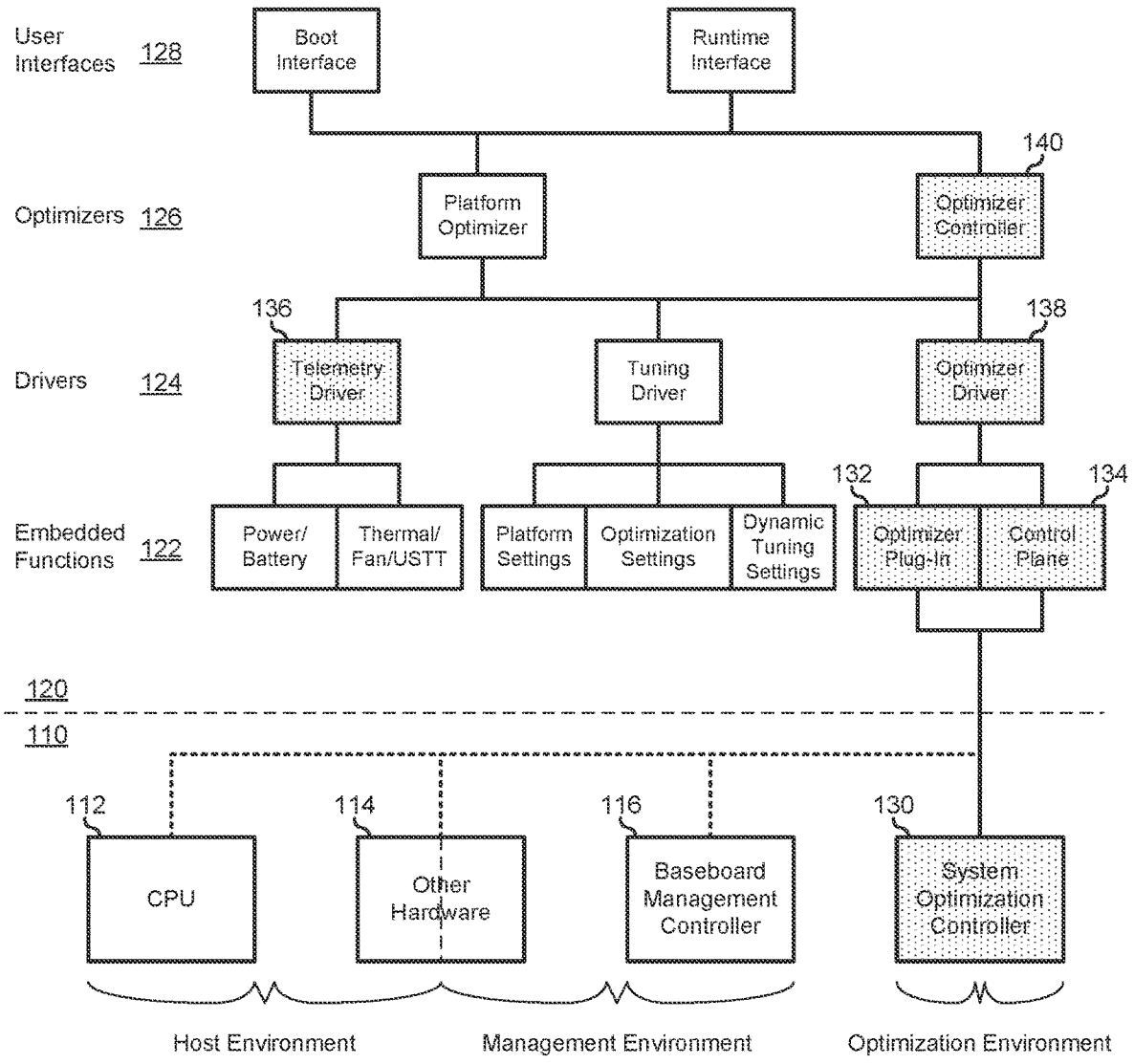
FIG. 1 is a block diagram of an information handling system according to an embodiment of the current disclosure.

FIG. 1 illustrates an information handling system 100 including system hardware 110 and system code 120. System hardware 110 represents hardware devices that are provided on information handling system 100 to implement a host environment, a management environment, and an optimization environment. In a particular embodiment, the host, management, and optimization environments represent separate processing systems to implement the functions and features of the associated environment. In particular, the host environment includes one or more processors (CPU) 112, and other hardware 114 that implement the functions and features normally associated with the processing tasks to which information handing system 100 is dedicated. In particular, the host environment may function to instantiate a Basic Input/Output System/Universal Extensible Firmware Interface (BIOS/UEFI) that loads an operating system (OS) to provide a processing environment to launch programs, applications, utilities, or the like. As such, other hardware 114 may include various I/O controller hubs, system memory devices, non-volatile memory devices, storage devices, human interface devices, network interface devices, or the like, as needed or desired. The functions and features of a host environment, including the instantiation of a BIOS/UEFI on hardware devices, the loading of an (OS), and the launching of programs, applications, and utilities, is known in the art and will not be further described herein, except as may be needed to illustrate the current embodiments.

The management environment includes a baseboard management controller (BMC) 116 and other hardware 114 that implement functions and features to monitor, manage, and maintain the operating state of information handling system 100 out-of-band from the operation of the host environment. To this end, BMC 116 is illustrated as being connected to CPU 112 and to other hardware 114. Some portions of other hardware 114 may be provided to implement the management environment, such as dedicated memory devices, complex programmable logic devices (CPLDs), lifecycle controllers, trusted platform modules, and the like. Further, other portions of other hardware 114 may represent the processing devices within the host environment itself. In this case, BMC 116 may be connected to various management interfaces of the hardware devices, such as via Inter-Integrated Circuit (I2C) or Improved Inter-Integrated Circuit (I3C) interfaces, System Peripheral Interfaces (SPIs), or the like, to obtain management information from the connected devices. Still other portions of other hardware 114 may represent auxiliary devices for operating information handling system 100, such as system cooling fans, system power supplies and voltage regulators, and the like.

In monitoring the operating state of information handling system 100, BMC 116 operates to access information from CPU 112, other hardware 114, and various elements of system code 120 to determine the operating state of the various elements, and to report the operating state information to a user or system administrator of the information handling system, or to a management system associated with the information handling system. In managing the operating state of information handling system 100, BMC 116 operates to set, adjust, change, or otherwise manipulate the settings, configurations, operating modes, or the like, of the various elements of hardware and software. For example, BMC 116 can set hardware parameters, BIOS/UEFI settings, firmware settings, safety and security settings, or the like, as needed or desired. In maintaining the operating state of information handling system 100, BMC 116 operates to provide for out-of-band firmware updates, reinstalls, reimages, and the like. For example, BMC 116 may operate to download and store BIOS/UEFI images or other firmware images out-of-band from the host environment, such that, on a next reboot of information handling system 100, the updated images are installed into the information handling system.

System software 120 includes embedded functions 122, drivers 124, optimizers 126, and user interfaces 128. Embedded functions 122 represent firmware associated with various hardware devices and functional settings for information handling system 100. Examples of embedded functions may include firmware provided to monitor, manage, and maintain power supplies, batteries, voltage regulators, and the like, thermal settings and system cooling devices as may be configured by an optimizer driver, platform settings such as BIOS/UEFI settings or firmware ROM settings, optimization settings, dynamic tuning settings as may be configured by a tuning driver, or other embedded functions, as needed or desired. or the like.

In addition to the monitoring, management, and of information handling systems as described above, information handling systems are increasingly being evaluated to ensure that the performance of not just the information handling systems, but also of the networks of which the information handling systems form a part, are optimized to provide the peak processing experience of the users of the information handling systems, peak performance of the networks, most efficient operation of both the information handling systems and the networks, and the like. For example, a typical information handling system deployed in an edge network may be configured to execute some processing tasks locally, while other tasks are performed in the edge network. Here, the balance of processing tasks between the information handling system and the edge network is constantly being evaluated to ensure that a particular policy or performance goal is being achieved. To this end, the manufacturers of information handling systems are increasingly deploying functional code on their information handling systems that operate to provide various performance optimizations. Such functional code provides the manufacturers with the ability to distinguish their products from their competitors and to provide added value to their customers. The functional code may be provided by more than one manufacturer on a particular information handling system. For example, an information handling system may include an OS image, such as a Windows OS, a Linux OS, or the like, an Intel Dynamic Tuning Technology suite (e.g., a driver, firmware associated with various Intel devices on the information handling system, or the like), a manufacturer optimization suite (e.g., a Dell Optimizer suite including an optimizer plug-in, a control panel, a driver, an optimizer controller, or the like), and various other device optimizers provided by the manufacturers of the various devices. Here, it will be understood that a device manufacturer may provide the device in accordance with a particular governing specification, but may also include various custom features that enhance the operations of the device, and that are accessible only through their own driver or optimizer. Thus the availability of a particular optimization or enhancement may be predicated on both the presence of the particular device and the associated device firmware or firmware revision to unlock the capability of the device.

It has been understood by the inventors of the current disclosure that a typical software image, such as an OS update, or a BIOS/UEFI update is propagated by the vendor of the particular software, and as such, does not always include the optimizations and enhancements associated with other vendor's products. Because of this, the value-add features associated with these products get deleted and disabled as the new software images are installed. Further, in order to retain such value-add features, a user or system administrator must typically take separate steps to install the various software packages on top of the software image. This problem is further exacerbated by the number of different add-on software packages that may need to be separately installed. As a result, the inventors have understood that many users or system administrators therefore do not bother to retain these software packages out of convenience.

The optimization environment represents a separate operating environment that operates out-of-band from the host environment, and includes a system optimization controller (SOC) 130, an optimizer plug-in 132 and a control plane 134 within embedded functions 122, a telemetry driver 136 and an optimizer driver 138 within drivers 124, and an optimizer controller 140 within optimizers 126. In a particular embodiment, the optimization environment, and particularly SOC 130 represents a separate processing device from BMC 116. In particular, the optimization environment may operate out-of-band from both the host environment and the management environment, as needed or desired. In another embodiment, SOC 130 represents an expanded functionality of BMC 116. In either case, SOC 130 represents a processing capacity that is tailored to the optimization of the functions and features of information handling system 100, both as a stand-alone system, and as a part of a network such as an edge network. As such, SOC 130 may be understood to include additional hardware elements, such as non-volatile memory devices, compute devices, I/O devices, or the like.

The optimization environment operates to monitor the operations of the hardware and software elements of information handling system 100. As such, SOC 130 is illustrated as being connected to CPU 112, other hardware 114, and BMC 116. The connections can include the management interfaces as described above, or other dedicated interfaces, as needed or desired. SOC 130 is further connected to optimizer plug-in 132 and control plane 134, and through the optimize plug-in and the control plane to optimizer driver 138. As illustrated, optimizer driver 138 is in communication with telemetry driver 136 and a tuning driver to reach down to the various functions of embedded functions 122. As illustrated, the optimization environment can work in parallel with various platform optimizers via optimizer controller 140, or, in the absence of such platform optimizers, the optimizer controller can operate alone to provide managed optimizations for information handling system 100. For example, optimizer controller 140 can receive various policy directives from a boot interface or a runtime interface in user interfaces 128 to control the optimization scheme deployed by the optimization environment. The boot interface represents, for example, a BIOS setup interface, while the runtime interface represents for example, a user interface that permits the user or system administrator to set or alter the optimization scheme, as needed or desired. In a particular embodiment, SOC 130 utilizes various machine learning (ML) algorithms, as described further below, to optimize the operating state of information handling system 100 and the network of which the information handling system is a part.

The optimization environment further operates to maintain the optimization state of information handling system 100. In particular, SOC 130 maintains stored copies of the various optimization firmware deployed on information handling system 100. Then, when an image restoration or reimaging of information handling system 100 is performed, SOC 130 operates to check the image for the presence of the various optimization firmware elements. In a particular embodiment, SOC 130 operates to check the image for the various optimization firmware elements, and appends any missing firmware elements to the image prior to the installation of the new image. In another embodiment, SOC 130 operates to permit the installation of the new image, and then checks the various hardware devices and embedded functions to ensure that all firmware elements are installed. Then, any missing firmware elements are installed on top of the reinstalled image.

Note that the optimization state of information handling system 100 may be independent of the particular architecture utilized in the information handling system. For example, information handling system 100 may include a CPU 112 and other hardware 114 that utilizes an Intel X86 architecture, an AMD X86 architecture, an ARM architecture, or another architecture, as needed or desired. Here, SOC 130 may be configured to implement an optimization environment that is common across all architectures. That is, the internal code for SOC 130 may not need to be altered or modified to accommodate the different architectures, but may execute common code in providing the optimization environment for all architectures. In particular, it will be understood that various elements of embedded functions 122 may change based upon the chosen architecture. However, because SOC 130 interacts with embedded functions 122 via drivers 124, the drivers will implement any function calls as needed by the elements of the embedded functions, but the SOC can operate to provide common function calls to the drivers regardless of the chosen architecture. In this way, SOC 130 operates to abstract a baseline optimization environment for information handling system 100 form the particular architecture utilized by the information handling system.

Figure 2:
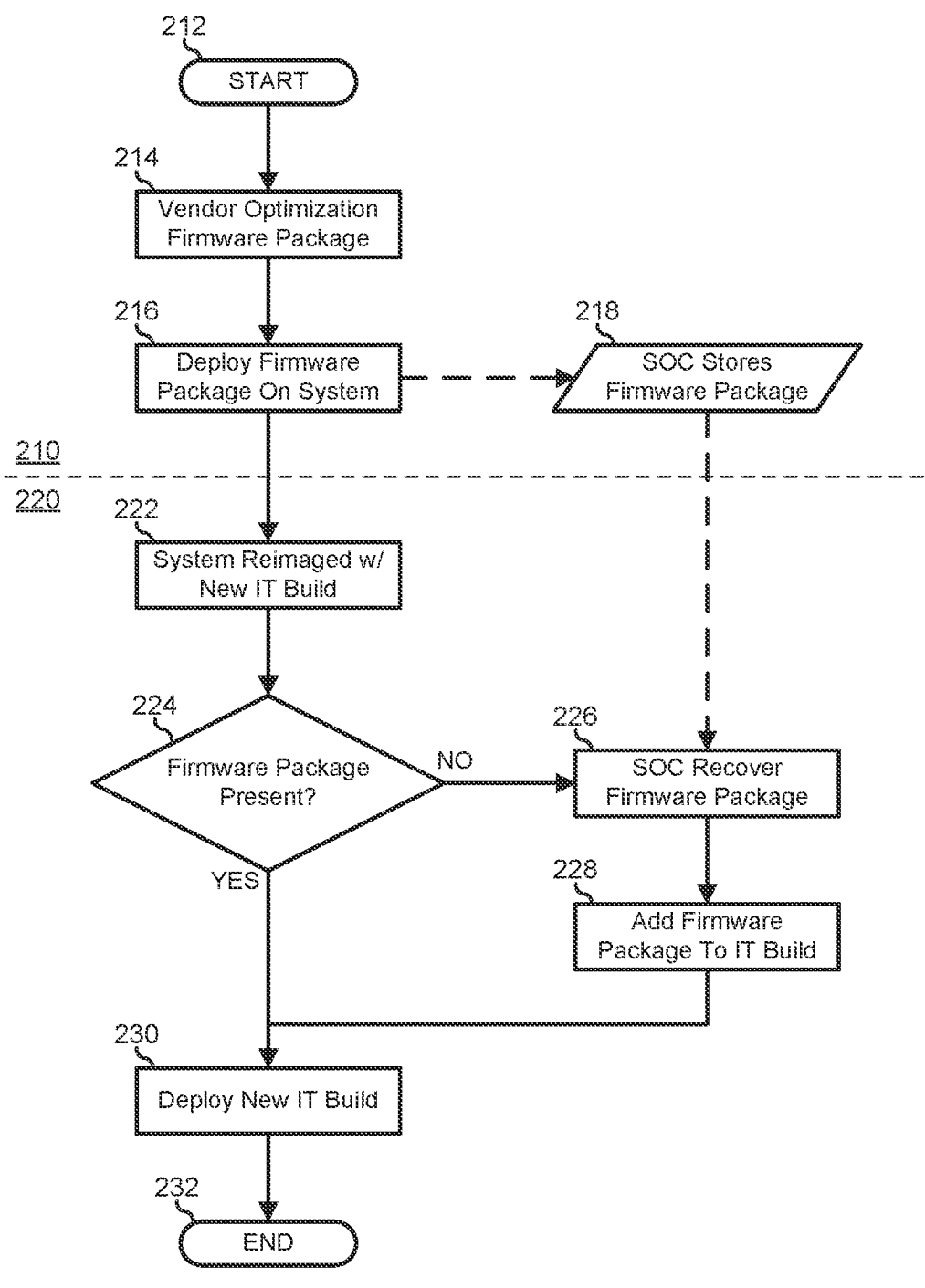
FIG. 2 is a flowchart illustrating a method for employing an embedded optimizer according to an embodiment of the current disclosure.

FIG. 2 illustrates a method 200 for employing an embedded optimizer to maintain the optimization firmware on an information handling system. The method is divided into a pre-sale portion 210 and an after-sale portion 220. Pre-sale portion 210 starts at block 212. A vendor of a hardware device or other firmware elements of an information handling system provides an optimization firmware package in block 214. The optimization firmware package is deployed on the information handling system in block 216, the optimization firmware package is stored by a SOC of the information handling system to a non-volatile memory associated with the SOC in block 218, and the method proceeds to after-sale portion 210.

The information handling system is reimaged with a new IT build in block 222, and a decision is made as to whether or not the vendor firmware package is included in the new IT build in decision block 224. If so, the "YES" branch of decision block 224 is taken, the new IT build is deployed in block 230, and the method ends in block 232. If the vendor firmware package is not included in the new IT build, the "NO" branch of decision block 224 is taken, the SOC recovers the firmware package in block 226, adds the firmware package to the new IT build in block 228, and the new IT build is deployed with the firmware package in block 230.

Figure 3:
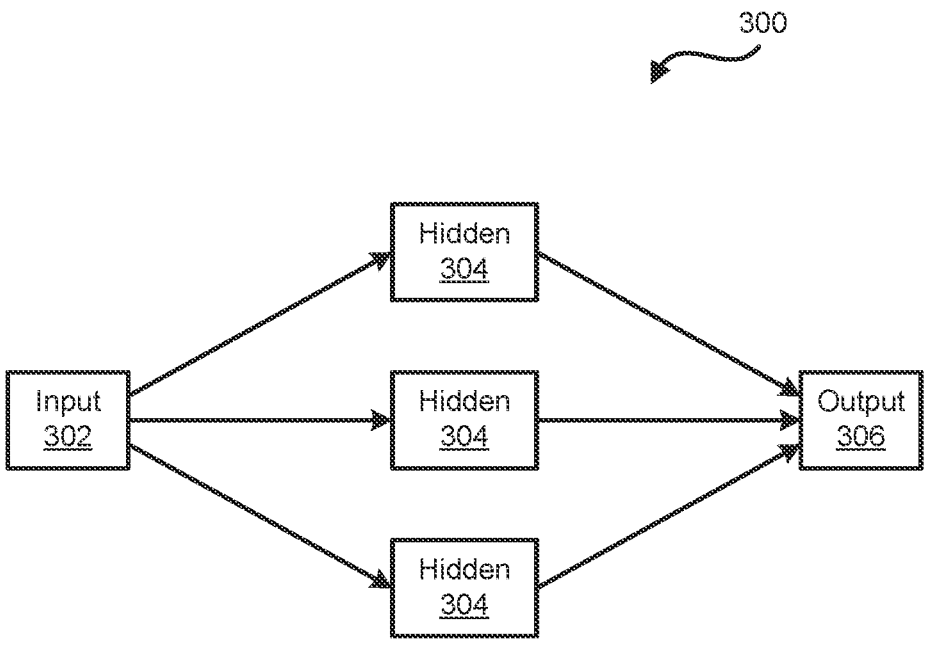
FIG. 3 is a block diagram of a machine learning (ML) system according to an embodiment of the current disclosure.

FIG. 3 illustrates a machine learning (ML) system 300 according to at least one embodiment of the disclosure. Machine learning system 300 includes an input layer 302, one or more hidden layers 304, and an output layer 306. Machine learning system 300 may be substantially similar to or incorporated into SOC 130 of FIG. 1. Input layer 302 may receive any suitable data associated with an information handling system, such as information handling systems 100 of FIG. 1, and provide the data to hidden layers 304. In an example, telemetry data may be utilized as an input data to input layer 302 of machine learning system 300. Hidden layers 304 may perform one or more operations on the input data, and determine a correlation between the survey response data and the telemetry data.

During training of machine learning system 300, input data may be utilized to correlate the telemetry data with the survey response data. During supervisory training, survey response data may be matched with the telemetry data for a corresponding information handling system. In an example, the training of hidden layers 304 may be performed in any suitable manner including, but not limited to, supervised learning, unsupervised learning, reinforcement learning, and self-learning. For example, if hidden layers 304 are trained via supervised learning, an individual may provide survey response data associated with an information handling system along with telemetry data for that information handling system. In an example, any machine learning model may be utilized for determining a user experience including, but not limited to, a linear regression model.

During execution of machine learning system 300, input layer 302 may receive telemetry data 304 and provide the telemetry data to hidden layers 304 in any suitable manner. For example, input layer 302 may convert the telemetry data into corresponding scaled values, may provide the telemetry data as received, or the like. Hidden layers 304 may then apply the received telemetry data to the training data, which may provide a user experience for the associated information handling system. The determined user experience may be provided via output layer 306. Machine learning system 300 may then perform the same operations to determine user experience for each information handling system in system 100, and these user experiences may be provided by output layer 306.

Figure 4:
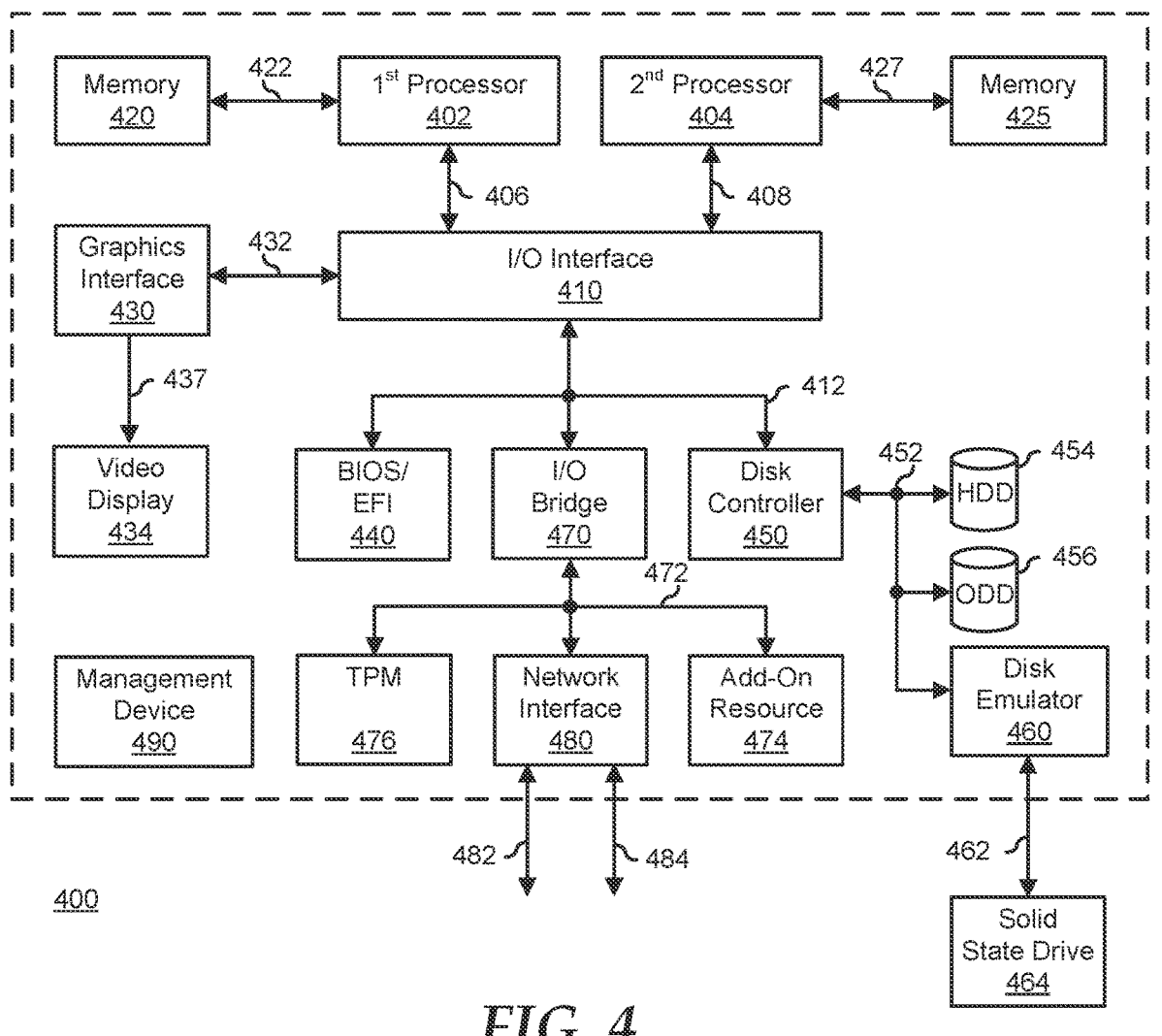
FIG. 4 is a block diagram illustrating a generalized information handling system according to another embodiment of the present disclosure.

FIG. 4 illustrates a generalized embodiment of an information handling system 400. For purpose of this disclosure an information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 400 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 400 can include processing resources for executing machine-executable code, such as a central processing unit (CPU), a programmable logic array (PLA), an embedded device such as a System-on-a-Chip (SoC), or other control logic hardware. Information handling system 400 can also include one or more computer-readable medium for storing machine-executable code, such as software or data. Additional components of information handling system 400 can include one or more storage devices that can store machine-executable code, one or more communications ports for communicating with external devices, and various input and output (I/O) devices, such as a keyboard, a mouse, and a video display. Information handling system 400 can also include one or more buses operable to transmit information between the various hardware components.

Information handling system 400 can include devices or modules that embody one or more of the devices or modules described below, and operates to perform one or more of the methods described below. Information handling system 400 includes a processors 402 and 404, an input/output (I/O) interface 410, memories 420 and 425, a graphics interface 430, a basic input and output system/universal extensible firmware interface (BIOS/UEFI) module 440, a disk controller 450, a hard disk drive (HDD) 454, an optical disk drive (ODD) 456, a disk emulator 460 connected to an external solid state drive (SSD) 464, an I/O bridge 470, one or more add-on resources 474, a trusted platform module (TPM) 476, a network interface 480, a management device 490, and a power supply 495. Processors 402 and 404, I/O interface 410, memory 420, graphics interface 430, BIOS/UEFI module 440, disk controller 450, HDD 454, ODD 456, disk emulator 460, SSD 464, I/O bridge 470, add-on resources 474, TPM 476, and network interface 480 operate together to provide a host environment of information handling system 400 that operates to provide the data processing functionality of the information handling system. The host environment operates to execute machine-executable code, including platform BIOS/UEFI code, device firmware, operating system code, applications, programs, and the like, to perform the data processing tasks associated with information handling system 400.

In the host environment, processor 402 is connected to I/O interface 410 via processor interface 406, and processor 404 is connected to the I/O interface via processor interface 408. Memory 420 is connected to processor 402 via a memory interface 422. Memory 425 is connected to processor 404 via a memory interface 427. Graphics interface 430 is connected to I/O interface 410 via a graphics interface 432, and provides a video display output 436 to a video display 434. In a particular embodiment, information handling system 400 includes separate memories that are dedicated to each of processors 402 and 404 via separate memory interfaces. An example of memories 420 and 425 include random access memory (RAM) such as static RAM (SRAM), dynamic RAM (DRAM), non-volatile RAM (NV-RAM), or the like, read only memory (ROM), another type of memory, or a combination thereof.

BIOS/UEFI module 440, disk controller 450, and I/O bridge 470 are connected to I/O interface 410 via an I/O channel 412. An example of I/O channel 412 includes a Peripheral Component Interconnect (PCI) interface, a PCI-Extended (PCI-X) interface, a high-speed PCI-Express (PCIe) interface, another industry standard or proprietary communication interface, or a combination thereof. I/O interface 410 can also include one or more other I/O interfaces, including an Industry Standard Architecture (ISA) interface, a Small Computer Serial Interface (SCSI) interface, an Inter-Integrated Circuit (I2C) interface, a System Peripheral Interface (SPI), a Universal Serial Bus (USB), another interface, or a combination thereof. BIOS/UEFI module 440 includes BIOS/UEFI code operable to detect resources within information handling system 400, to provide drivers for the resources, initialize the resources, and access the resources. BIOS/UEFI module 440 includes code that operates to detect resources within information handling system 400, to provide drivers for the resources, to initialize the resources, and to access the resources.

Disk controller 450 includes a disk interface 452 that connects the disk controller to HDD 454, to ODD 456, and to disk emulator 460. An example of disk interface 452 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 460 permits SSD 464 to be connected to information handling system 400 via an external interface 462. An example of external interface 462 includes a USB interface, an IEEE 2394 (Firewire) interface, a proprietary interface, or a combination thereof. Alternatively, solid-state drive 464 can be disposed within information handling system 400.

I/O bridge 470 includes a peripheral interface 472 that connects the I/O bridge to add-on resource 474, to TPM 476, and to network interface 480. Peripheral interface 472 can be the same type of interface as I/O channel 412, or can be a different type of interface. As such, I/O bridge 470 extends the capacity of I/O channel 412 when peripheral interface 472 and the I/O channel are of the same type, and the I/O bridge translates information from a format suitable to the I/O channel to a format suitable to the peripheral channel 472 when they are of a different type. Add-on resource 474 can include a data storage system, an additional graphics interface, a network interface card (NIC), a sound/video processing card, another add-on resource, or a combination thereof. Add-on resource 474 can be on a main circuit board, on separate circuit board or add-in card disposed within information handling system 400, a device that is external to the information handling system, or a combination thereof.

Network interface 480 represents a NIC disposed within information handling system 400, on a main circuit board of the information handling system, integrated onto another component such as I/O interface 410, in another suitable location, or a combination thereof. Network interface device 480 includes network channels 482 and 484 that provide interfaces to devices that are external to information handling system 400. In a particular embodiment, network channels 482 and 484 are of a different type than peripheral channel 472 and network interface 480 translates information from a format suitable to the peripheral channel to a format suitable to external devices. An example of network channels 482 and 484 includes InfiniBand channels, Fibre Channel channels, Gigabit Ethernet channels, proprietary channel architectures, or a combination thereof. Network channels 482 and 484 can be connected to external network resources (not illustrated). The network resource can include another information handling system, a data storage system, another network, a grid management system, another suitable resource, or a combination thereof.

Management device 490 represents one or more processing devices, such as a dedicated baseboard management controller (BMC) System-on-a-Chip (SoC) device, one or more associated memory devices, one or more network interface devices, a complex programmable logic device (CPLD), and the like, that operate together to provide the management environment for information handling system 400. In particular, management device 490 is connected to various components of the host environment via various internal communication interfaces, such as a Low Pin Count (LPC) interface, an Inter-Integrated-Circuit (I2C) interface, a PCIe interface, or the like, to provide an out-of-band (OOB) mechanism to retrieve information related to the operation of the host environment, to provide BIOS/UEFI or system firmware updates, to manage non-processing components of information handling system 400, such as system cooling fans and power supplies. Management device 490 can include a network connection to an external management system, and the management device can communicate with the management system to report status information for information handling system 400, to receive BIOS/UEFI or system firmware updates, or to perform other task for managing and controlling the operation of information handling system 400. Management device 490 can operate off of a separate power plane from the components of the host environment so that the management device receives power to manage information handling system 400 when the information handling system is otherwise shut down. An example of management device 490 include a commercially available BMC product or other device that operates in accordance with an Intelligent Platform Management Initiative (IPMI) specification, a Web Services Management (WSMan) interface, a Redfish Application Programming Interface (API), another Distributed Management Task Force (DMTF), or other management standard, and can include an Integrated Dell Remote Access Controller (iDRAC), an Embedded Controller (EC), or the like. Management device 490 may further include associated memory devices, logic devices, security devices, or the like, as needed or desired.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An information handling system, comprising:
a processor configured to instantiate a host processing environment;
a baseboard management controller configured to instantiate a management environment that operates out-of-band from the host processing environment; and
a system optimization controller that operates in the management environment and that is configured to evaluate a first software image instantiated on the host processing environment to determine the presence of optimization firmware in the first software image, the optimization firmware being associated with a different element of the information handling system than the first software image, to store the optimization firmware, to evaluate a second software image to be installed on the host processing system to determine whether or not the optimization firmware is present in the second software image, and, when the optimization firmware is not present in the second software image, to retrieve the optimization firmware and to install the optimization firmware on the host processing system, wherein the system optimization controller includes a hardware device different from the baseboard management controller and different from the processor.

2. The information handling system of claim 1, wherein, in installing the optimization firmware, the system optimization controller is further configured to append the optimization firmware to the second software image prior to the second optimization software being installed on the host processing system.

3. The information handling system of claim 1, wherein the system optimization controller is further configured to install the optimization firmware after the second software image is installed on the host processing system.

4. The information handling system of claim 1, wherein the system optimization controller is further configured to evaluate an operational state of the information handling system, and to determine that the operational state can be improved by changing a setting of the optimization firmware.

5. The information handling system of claim 4, wherein the system optimization controller is further configured to change the setting of the optimization firmware to improve the operational state.

6. The information handling system of claim 4, wherein the operational state includes an operation of the information handling system within an edge processing network.

7. The information handling system of claim 1, wherein the system optimization controller is further configured to abstract an optimization state of the information handling system from an architecture associated with the processor.

8. The information handling system of claim 1, wherein the system optimization controller is coupled to the baseboard management controller.

9. A method, comprising:
providing, on an information handling system, a processor configured to instantiate a host processing environment;
providing, on the information handling system, a baseboard management controller configured to instantiate a management environment that operates out-of-band from the host processing environment; and
providing, on the information handling system, a system optimization controller that operates in the management environment, wherein the system optimization controller includes a hardware device different from the baseboard management controller and different from the processor;

evaluating a first software image instantiated on the host processing environment to determine the presence of optimization firmware in the first software image, the optimization firmware being associated with a different element of the information handling system than the first software image;

storing the optimization firmware;

evaluating a second software image to be installed on the host processing system to determine whether or not the optimization firmware is present in the second software image; and when the optimization firmware is not present in the second software image:

retrieving the optimization firmware; and installing the optimization firmware on the host processing system.

10. The method of claim 9, wherein, in installing the optimization firmware, the method further comprises:

appending the optimization firmware to the second software image prior to the second optimization software being installed on the host processing system.

11. The method of claim 9, wherein, in installing the optimization firmware, the method further comprises:

installing the optimization firmware after the second software image is installed on the host processing system.

12. The method of claim 9, further comprising:

evaluating an operational state of the information handling system; and determining that the operational state can be improved by changing a setting of the optimization firmware.

13. The method of claim 12, further comprising:

changing the setting of the optimization firmware to improve the operational state.

14. The method of claim 12, wherein the operational state includes an operation of the information handling system within an edge processing network.

15. The method of claim 9, further comprising:

abstracting, by the system optimization controller, an optimization state of the information handling system from an architecture associated with the processor.

16. An information handling system, comprising:

a processor configured to instantiate a host processing environment;

a baseboard management controller configured to instantiate a management environment that operates out-of-band from the host processing environment; and a system optimization controller configured to instantiate a management environment that operates out-of-band from the host processing environment, to evaluate a first software image instantiated on the host processing environment to determine the presence of optimization firmware in the first software image, the optimization firmware being associated with a different element of the information handling system than the first software image, to store the optimization firmware, to evaluate a second software image to be installed on the host processing system to determine whether or not the optimization firmware is present in the second software image, when the optimization firmware is not present in the second software image, to retrieve the optimization firmware and to install the optimization firmware on the host processing system after the second software image is installed on the host processing system, and to evaluate an operational state of the information handling system, and to determine that the operational state can be improved by changing a setting of the optimization firmware, wherein the system optimization controller includes a hardware device different from the baseboard management controller and different from the processor.

* * * * *